(12) United States Patent
Kutter et al.

(10) Patent No.: US 10,789,463 B2
(45) Date of Patent: *Sep. 29, 2020

(54) METHOD AND APPARATUS FOR AUTHENTICATION OF A 3D STRUCTURE

(71) Applicant: ALPVISION S.A., Vevey (CH)

(72) Inventors: Martin Kutter, Remaufens (CH); Fred Jordan, Les Paccots (CH)

(73) Assignee: ALPVISION S.A., Vevey (CH)

( * ) Notice: Subject to any disclaimer, the term of this patent is extended or adjusted under 35 U.S.C. 154(b) by 339 days.

This patent is subject to a terminal disclaimer.

(21) Appl. No.: 15/985,091

(22) Filed: May 21, 2018

(65) Prior Publication Data

US 2018/0268214 A1 Sep. 20, 2018

Related U.S. Application Data

(63) Continuation of application No. 15/346,234, filed on Nov. 8, 2016, now Pat. No. 10,019,627.
(Continued)

(51) Int. Cl.
*G06K 9/00* (2006.01)
*G07D 7/00* (2016.01)
(Continued)

(52) U.S. Cl.
CPC ....... *G06K 9/00577* (2013.01); *G06K 7/1417* (2013.01); *G06T 7/0004* (2013.01);
(Continued)

(58) Field of Classification Search
CPC ............. G06K 7/1417; G06K 9/00577; G06K 2009/0059; G07D 7/202; G07D 7/003;
(Continued)

(56) References Cited

U.S. PATENT DOCUMENTS 4,371,866 A 2/1983 Smith
4,490,849 A 12/1984 Grumet et al.
(Continued)

FOREIGN PATENT DOCUMENTS

EP 0 578 875 1/1994
EP 1867470 12/2007
(Continued)

*Primary Examiner* — Shaghayegh Azima
(74) *Attorney, Agent, or Firm* — DLA Piper LLP (US)

(57) ABSTRACT

New authentication features are proposed that are visible, can be authenticated with a mobile equipment and yet are challenging to counterfeit. In a possible embodiment, the surface of the authentication feature may have three-dimensional characteristics, which can be recognized by a hand-held camera, such as a smartphone camera, while it cannot be easily reproduced by a simple scan and print procedure. In a further possible embodiment, at least two different viewpoints of the authentication feature may be acquired using a smartphone camera and the resulting images may be analyzed using the smartphone processor to identify the three-dimensional characteristics of the authentication feature. The manufacturing of the feature may be performed at a low cost by embossing the three dimensional structure on a surface. The authentication feature may be carried by a self-adhesive label or directly embedded on the product packaging.

23 Claims, 9 Drawing Sheets

Related U.S. Application Data

(60) Provisional application No. 62/253,482, filed on Nov. 10, 2015.

(51) Int. Cl.

| | | |
|---|---|---|
| *G07D 7/2033* | (2016.01) | |
| *G07D 7/202* | (2016.01) | |
| *G06K 7/14* | (2006.01) | |
| *G06T 7/00* | (2017.01) | |

(52) U.S. Cl.
CPC ............ *G07D 7/003* (2017.05); *G07D 7/202* (2017.05); *G07D 7/2033* (2013.01); *G06K 2009/0059* (2013.01); *G06T 2207/10004* (2013.01); *G06T 2207/10032* (2013.01); *G06T 2207/30164* (2013.01)

(58) Field of Classification Search
CPC ............... G07D 7/2033; G06T 7/0004; G06T 2207/10004; G06T 2207/10032; G06T 2207/30164
See application file for complete search history.

(56) References Cited

U.S. PATENT DOCUMENTS

| | | | |
|---|---|---|---|
| 5,159,647 A | 10/1992 | Burt | |
| 5,454,045 A | 9/1995 | Perkins et al. | |
| 5,975,581 A | 11/1999 | Nicolette et al. | |
| 6,030,657 A | 2/2000 | Butland et al. | |
| 6,038,074 A * | 3/2000 | Kitaguchi | G01C 11/06 128/916 |
| 6,384,409 B1 | 5/2002 | Libbey, III et al. | |
| 6,459,175 B1 | 10/2002 | Potega | |
| 6,461,987 B1 | 10/2002 | Walker et al. | |
| 6,504,948 B1 | 1/2003 | Schemmel | |
| 6,546,125 B1 | 4/2003 | Su | |
| 6,547,137 B1 | 4/2003 | Begelfer et al. | |
| 6,565,000 B2 | 5/2003 | Sehr | |
| 6,584,214 B1 | 6/2003 | Pappu et al. | |
| 6,629,061 B1 | 9/2003 | Shaffer | |
| 6,706,314 B2 | 3/2004 | Butland | |
| 6,776,341 B1 | 8/2004 | Sullivan et al. | |
| 6,869,015 B2 | 3/2005 | Cummings et al. | |
| 6,920,437 B2 | 7/2005 | Messina | |
| 6,922,687 B2 | 7/2005 | Vernon | |
| 6,928,552 B1 | 8/2005 | Mischenko et al. | |
| 7,492,920 B2 | 2/2009 | Jordan et al. | |
| 7,546,114 B1 | 6/2009 | Glaze | |
| 7,684,088 B2 | 3/2010 | Jordan et al. | |
| 7,965,862 B2 | 6/2011 | Jordan et al. | |
| 8,059,858 B2 * | 11/2011 | Brundage | G07D 7/0034 283/74 |
| 8,180,174 B2 | 5/2012 | Di Venuto et al. | |
| 8,885,884 B2 * | 11/2014 | Genc | G06T 7/20 382/103 |
| 8,994,956 B2 | 3/2015 | Francois | |
| 2002/0146153 A1 | 10/2002 | Hu | |
| 2003/0014647 A1 | 1/2003 | Bourrieres et al. | |
| 2003/0076989 A1 | 4/2003 | Maayah | |
| 2003/0219145 A1 | 11/2003 | Smith | |
| 2004/0076310 A1 | 4/2004 | Hersch | |
| 2004/0079800 A1 | 4/2004 | Sugino et al. | |
| 2005/0053259 A1 | 3/2005 | Asano et al. | |
| 2005/0075984 A1 | 4/2005 | Bourrieres et al. | |
| 2006/0013486 A1 | 1/2006 | Burns | |
| 2007/0291988 A1 | 12/2007 | Karimov et al. | |
| 2013/0153651 A1 * | 6/2013 | Fedorovskaya | G06K 5/00 235/375 |
| 2013/0156330 A1 * | 6/2013 | Kane | G06K 9/00 382/218 |

FOREIGN PATENT DOCUMENTS

| | | |
|---|---|---|
| GB | 2 221 870 | 2/1990 |
| GB | 2 417 074 | 2/2006 |
| GB | 2 417 592 | 3/2006 |
| GB | 2 417 707 | 3/2006 |
| GB | 2 426 100 | 11/2006 |
| WO | WO 92/15965 | 9/1992 |
| WO | WO 01/43086 | 6/2001 |
| WO | WO 2005/088517 | 9/2005 |
| WO | WO 2005/088533 | 9/2005 |
| WO | WO 2005/122100 | 12/2005 |
| WO | WO 2006/078651 | 7/2006 |
| WO | WO 2008/053121 | 5/2008 |
| WO | WO 2014/182963 | 11/2014 |

* cited by examiner (a)                  (b)                  (c)

METHOD AND APPARATUS FOR AUTHENTICATION OF A 3D STRUCTURE

CROSS-REFERENCE TO RELATED APPLICATIONS

This application is a continuation application to U.S. patent application Ser. No. 15/346,234 filed Nov. 8, 2016, which claims priority from U.S. Provisional Application Nos. 62/253,482 filed Nov. 10, 2015, the contents of which are hereby incorporated by reference herein in their entireties.

BACKGROUND

This disclosure relates to anti-counterfeiting, anti-tampering and traceability for valuable items. Each of these three security issues is generally addressed using a specific approach.

To prevent counterfeiting, prior art approaches are often based on special markings (like holograms, DNA codes, optically variable inks, invisible inks, Cryptoglyph, microtext, etc.) where an operator checks if the marking is there or not. Such solutions are useful mainly against counterfeiting (and tampering in some cases) and their security principally relies on the complexity to counterfeit the marking. In particular, invisible markings may be printed over a surface of the valuable item or good, as described for instance in applicants U.S. Pat. Nos. 7,492,920, 7,684,088, and 7,965,862.

To prevent tampering, most prior art solutions are either based on a redundant encoding strategy or on a tamper evident approach. Redundant security is based on a double encoding of critical information (like the name on a passport which is also encoded in the attached magnetic strip, or the hash of a text which is printed on a document which should not be modified). Tamper evidence can also be achieved using various physical or chemical means, which enable to detect modifications performed to a document or to a package. Such means include special paper treatments that enable it to be immediately colored by solvents or ultrasonic detection systems, which are capable of detecting an overlay of a thin piece of paper.

Traceability is achieved using a unique identification of each item. Traceability systems typically require a central database to maintain a record of information for each numbered item. The unique identification can be added to the item for instance by printing a barcode encoding a unique number, or by using unique item properties and storing them in the database, similar to the human fingerprint. It should be noted that unique identification potentially enables addressing all security issues like counterfeiting, tampering and diversion in a joint approach.

For carton and paper items, unique identification is often performed by ink-jet printing (DOD or continuous), laser printing, or engraving of an alphanumeric identifier or an information carrying code, such as a barcode, 2D matrix code, or QR code.

In the case of tampering detection, a major goal of the anti-tampering method is to guarantee that data printed in clear text on a document has not been illegally modified (for instance to increase of the face value of a check). As an example, one simple way to reach this objective is to uniquely identify the document with an identification number printed on it (for instance using a barcode or hexadecimal string). This number gives access through a look-up table to all the data printed in clear text on the document. It is then possible to check if the data printed on the document matches with the data stored in the look-up table. Optical Character Recognition/OCR may be used for automating the comparison process. An exemplary solution for integrity check of identity documents is described in U.S. Pat. No. 6,920,437, while another for passport documents is detailed in U.S. Pat. No. 6,565,000.

Traceability is particularly important for monitoring the supply chain of valuable items and tracking parallel import of goods (diversion—gray market goods). In order to track the diversion of goods, unique identifiers for each package may be recorded in a database along with the target country and other supply chain related data. In the case of gray market, the good may be re-imported (diverted) into a country different from the original target country. By retrieving the unique code identifier it is then possible to trace back the origin of the good and the original target country. Exemplary system architectures of such an approach, comprising a central server, a central database and client applications, are described for instance in U.S. Pat. Nos. 6,922,687 and 6,547,137, where the identifier is printed on a label attached to the product. For the pharmaceutical industry, this solution may also be implemented by marking the identifier directly on a label or a pill as described in U.S. Pat. No. 6,776,341. For the electronic industry, U.S. Pat. No. 6,629,061 describes a solution where the identifier is printed on the circuit board and embedded in the memory device; another approach for fighting gray market in the power supply industry is given in U.S. Pat. No. 6,459,175. For the clothing industry, U.S. Pat. No. 6,461,987 describes a solution where a unique identification is obtained by the means of micro label strips.

In the case of counterfeit detection, identifiers of all the produced packages or documents are kept in a central database. For each product it is then possible to interrogate the database and know:

If the identifier belongs to the database. If so, then it is the proof that this is a valid identifier, i.e. it has not been invented by a counterfeiter (in some cases identification numbers are randomly chosen using a secret algorithm).

If another request has already been sent for the same identifier, which may indicate that several counterfeit copies of the same product exist. This method is not very reliable since the server may be unable to differentiate between this case and several authentications of the same genuine product without additional intelligence. By default, in the case where a counterfeiter takes a genuine product and copies it many times, the first authentication attempt of a fake product will be positive as the first request on the database, while a later first authentication request of the genuine product may fail as the second request to the database.

Some of the latter solutions for traceability also apply to counterfeit detection, for instance U.S. Pat. No. 6,776,341 using labels or U.S. Pat. No. 6,461,987 using micro label strips for the clothing industry. The application of the code can be performed either by means of printing or engraving as described for instance in U.S. Pat. No. 6,706,314, where a laser may be used for reading the code either for traceability or for anti-counterfeiting applications. Special light sources may also be used with material reacting to specific wavelengths. While this approach usually only provides a binary answer (since it is capable of generating a very limited number of different identifiers), U.S. Pat. No. 6,384,409 mentions fighting gray market using this approach. Biological markers may also be used, as described in U.S.

Pat. No. 6,030,657, or magnetic patterns, as described in U.S. Pat. No. 5,975,581, with dedicated readers.

The unique identification methods of the prior art as described above therefore enable to solve three different security issues: anti-tampering, traceability and anti-counterfeiting. However, they have some critical drawbacks in practice:

The answer given by the central server is not reliable: products detected as authentic might actually be fakes, and vice-versa;

They require applying a unique code on each item, which is expensive.

They require a dedicated connection from the reader/detection device to a central server.

An additional limitation of the above solutions is that they primarily rely upon the addition of a 2D information, such as a barcode, a covert marking or a printed identifier, to a valuable item or good material or printed surface. This limitation to 2D reduces the search space for potential counterfeiters who can devote significant effort and investments to extract and reproduce the security features. For certain applications, it may therefore be desirable to extend the security features to additional material dimensions.

In that context, a different approach enabling unique identification without applying a unique code, sometimes referred to as "fingerprint" or PUF (Physical Unclonable Function) may be used. The fundamental approach consists in precisely measuring/identifying/characterizing some intrinsic features of the document or product material or surface and use it in order to identify the product uniquely. Features can for instance be color fluctuation, surface roughness, material structures, etc. For instance, Ingenia Technology proposed to measure the micro topology of carton and paper with a coherent light source (typically produced by a laser) for unique identification purposes in patent applications GB0418138.4, GB0418173.1, GB0418178.0 and GB0509635.9. This technology may be directly embedded in printer device, as described in PCT/GB2005/000903. This technology can basically be used on any chaotic surface, using an array of laser sources enabling to probe the material surface at various incidences, as described in PCT/GB2005/000922. A similar approach was described in application GB2221870 from De La Rue Company Plc, where the scattering of a coherent light was used for detection. Another solution is described in U.S. Pat. No. 6,584,214 by MIT where the whole 3D chaotic structure of a material is used to generate a unique identifier. The 3D structure is acquired using devices based on coherent light (for non-transparent material) or ultrasound and X-rays (for transparent materials). Another approach using ultrasonic measurement is described in U.S. Pat. No. 5,454,045, where features (either macroscopic or microscopic) are measured inside a material, stored and subsequently compared with new measurements for matching controls.

In published patent applications US20050075984, US20030014647 and US20030712659, a method based on random set of micro bubbles inserted in a transparent medium and stuck on products is described. The detection is based on measurement of shadows and reflections from a single 2D image capture to determine a unique signature for each set of bubbles. The transparent medium is then physically affixed to the product or document to be identified. This approach is unusual as it is somewhat between two approaches: on the one hand it is an analog random process but on the other hand it requires the transparent medium to be physically applied on the product which is conceptually the same approach as printing out a serial number, yet with an extra micro bubble depth.

Another family of solutions is based on the creation of a digital signature using the random and chaotic nature of materials. Such a digital signature can be used for authentication purposes, for encryption purposes or for tampering detection. Applications related to authentication are for instance disclosed in U.S. Pat. No. 6,928,552, where the signature is encrypted and printed on the material itself as a unique image for each item sample. Various patent applications disclosed by the company Signoptic Technologies also focus on the generation and use of a digital signature using material microstructure. In document WO2005/122100, different applications are described where the signature is used to encrypt data. Document WO2006/078651 focuses specifically on signatures obtained from fibrous materials for authentication purposes. U.S. Pat. No. 8,994,956 and WO2008053121A2 describe specific optical devices and accessories for the observation, by reflection, of structural details of an object at millimeter or sub-millimeter scales.

Thus, the prior art approaches still have one or more of the following drawbacks in anti-counterfeiting practice:

Fingerprinting technologies require capture of thousands or even millions of reference images for all possible intrinsic features that may be encountered in the genuine set of items to authenticate. Moreover, each image must be of controlled quality, indeed any bad reference image will result in an unreliable answer (false positive or false negative). In a real world industrial environment where production can take place in a number of remote places, this requirement may increase the cost of deployment to an unacceptable level. Two particular examples of added costs are the hardware and software infrastructure setup or production delays (production must be stopped in case of network or imaging issues for instance).

Most authentication methods based on the material structure require a network access to a central server and computing system, which limits their use to connected areas and slows downs substantially the authentication process.

Detection and classification into genuine versus counterfeit require specific acquisition devices, such as coherent light beamers, magnifiers or special optical accessories, in order to enable the detection of the intrinsic features. For a number of authentication applications, it is desirable to use standard imaging devices like smartphone cameras for instance.

Rather than relying upon the intrinsic features of the item material or surface as in the above fingerprinting solutions, another approach consists in embossing, that is deforming, the 3D surface of a packaging foil (for instance for cigarette packets) or package for authentication purposes. As described for instance by Boegli Gravures in EP1867470, an array of identification marks such as signs, dots or patterns may be embossed on-line with the staining and the embossing of logos, possibly in the stained and/or the logo areas. The method described in EP1867470 is however limited to weak authentication, as the embossing pattern is detectable by a simple template matching image or video camera processing technique with minimal noise level thresholding, which means a counterfeiter can easily detect the embossing pattern and reproduce it by similar imaging techniques; the whole security relies upon the challenge of embossing counterfeit packets, or as suggested in EP1867470, the combination with alternative 2D authentication methods used in automatic image processing, such as gray scale correlation and methods developed by applicants as described in U.S. Pat. Nos. 7,492,920, 7,684,088, or U.S. Pat. No. 7,965,862. These solutions however only exploit the 2D space, while it is desirable in certain applications to also take advantage of the 3D dimension associated with the embossing process.

In WO2014182963 by Digimarc, two patterns of information-conveying tiles are formed, one by printing, and the other by embossing. In general, the printing includes a tiled watermark pattern that conveys plural-bit payload data that may be suitable for authentication purposes, while the embossing includes a tiled watermark pattern that conveys spatial calibration information to facilitate the retrieval of the plural-bit payload data, in accordance with Digimarc digital watermarking technology, as known to those skilled in the art of steganography and watermarking. Thus in this solution the embossing is limited to a calibration functionality and the authentication robustness still relies upon that of the underlying 2D marking technology. As mentioned in WO2014182963, embossing may also embed the marking payload, yet the Digimarc solution requires some exhaustive search steps for detection of the marking that may not be applicable real-time in such a scenario—or if it is feasible, counterfeiters may also apply exhaustive search to reverse and reproduce the embedded marking.

There is therefore a need for novel solutions that provide some or all of the following advantages:

No network connection required

No dedicated hardware required, efficient enough to work with standard smartphones Low production cost Challenging to counterfeit User friendly

BRIEF SUMMARY

In some embodiments, a method for authenticating a 3D pattern of a 3D item surface with an imaging device, comprises the steps of:

providing, with an imaging device screen, an indication of a first imaging device position;

capturing, with an imaging device camera, a first digital image of the 3D pattern surface;

comparing, with an imaging device processor, the first image with a 3D pattern reference image to generate a first characteristic signal;

providing, with an imaging device screen, an indication of a second imaging device position;

capturing, with the imaging device camera, a second digital image of the 3D pattern surface;

comparing, with the imaging device processor, the second image with the a 3D pattern reference image to generate a second characteristic signal;

measuring, with the imaging device processor, a difference between the first and second characteristic signals; and determining, with the imaging device processor, an authenticity of the 3D pattern based at least in part on whether the measured difference is above a pre-defined threshold.

In a possible embodiment, the difference between the first and second cross-correlation signals may be measured as the angle between a first vector joining a first point of highest correlation value in a pre-defined area of the first cross-correlation image signal to a second point of the lowest correlation value in a pre-defined neighborhood area of the first point in the first cross-correlation image signal and a second vector joining a third point of highest correlation value in a pre-defined area of the second cross-correlation image signal to a fourth point of the lowest correlation value in a pre-defined neighborhood area of the third point in the second cross-correlation image signal.

If the measured difference is above a pre-defined threshold, the 3D pattern may be authenticated as genuine. The imaging device may indicate a success signal to the end user by displaying a message onto the imaging device display screen, and/or by emitting a sound onto an imaging device display speaker, and/or by producing a vibration of the imaging device, for instance when a smartphone is used as the imaging device.

The 3D pattern may be generated by various manufacturing means such as embossing and hot stamping from a 3D pattern reference image designed to represent random or pseudo random dot locations, and/or random or pseudo random dot sizes, and/or random or pseudo random dot greyscale values.

In order to prevent the 3D item counterfeiting by means of 3D pattern surface reverse engineering, for instance by molding, the 3D pattern structure may be filled with a transparent material resistant to solvents. Alternately, in applications where the 3D pattern surface material is sensitive to certain solvents, the 3D pattern structure may filled with a transparent material sensitive to the same solvents as the 3D item surface material.

DETAILED DESCRIPTION

Overview

Figure 1:
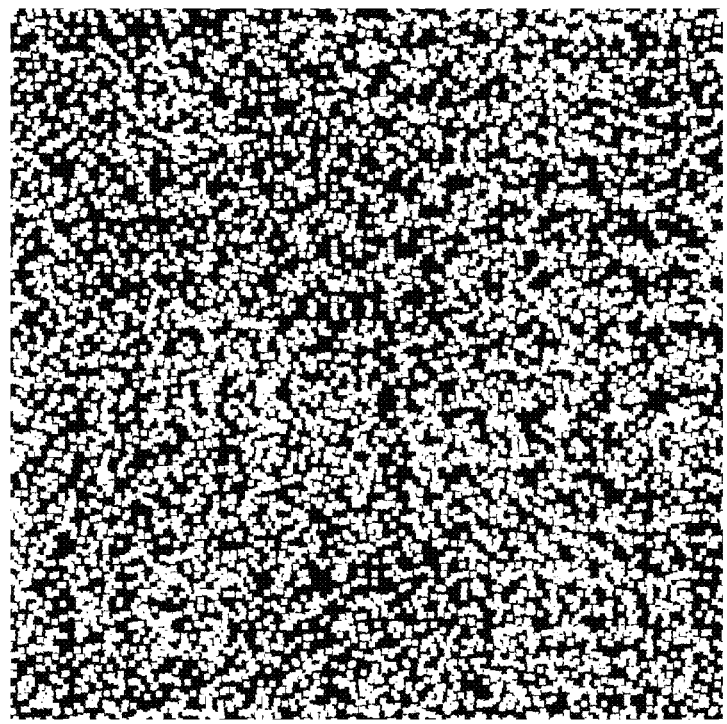
FIG. 1: Example of bitmap image of a pattern, generated with a pseudo-random generator, used to define the embossed areas.

Robust authentication features may be engineered in such a way that they are simple to check during the authentication process without requiring significant user expertise, while remaining difficult to counterfeit/copy. In a preferred embodiment, three dimensional (3D) surface structures are used as robust authentication features as they are difficult to reproduce in an accurate way. These structures are first associated with the product in an embedding stage, for instance at the time of manufacturing the product, and later detected in a detection stage, for instance at the customs.

At the embedding stage, many possibilities exist to obtain these 3D structures. For instance, they can be designed and then produced using dedicated production tools or processes. They may already be characterized from inherent product features. Other approaches may consist in selecting specific production processes to create process specific 3D structures.

At the detection stage, the authentication process relies on the comparison of the 3D structure with a reference. In a possible embodiment, the comparison may use at least two image captures from different viewpoints of the 3D structure. By using different viewpoints, the 3D surface may be uniquely characterized.

The counterfeit challenge therefore consists in producing an accurate replicate of the 3D structure. In particular, the counterfeit would be successful if simple copies or low quality 3D reproductions of the surface may be recognized as non-genuine. The capture of the 2D images may be done with any imaging devices. In one embodiment, a mobile/smart phone such as the Apple iPhone or the Samsung Galaxy series may be used. As an example, when using a smart phone, different viewpoint images may be captured by moving the smart phone from left to right. Different viewpoint images may also be extracted from a video capture.

In other embodiments, USB microscopes, scanners, etc. may also be used. In still other embodiments, the imaging device may be purpose-built device that includes circuits for performing the techniques described herein. The device may include one or more processors (which can be microprocessors or digital signal processors), application-specific integrated circuits, field programmable gate arrays, and/or discrete logic, or any combination of the foregoing. The device may also include or be connectable to a camera or other imaging system, one or more memories (including both non-volatile and volatile memories), and a display screen.

3D Pattern Design

In the remainder of this application, the terminology "pattern", "item", "feature" or "structure" will be used interchangeably regardless of the actual underlying geometrical shape, support material, and manufacturing process.

Depending on the manufacturing process used to produce the valuable item or good to be authenticated, designing the 3D authentication structure may rely on different approaches. The most sophisticated and robust way consists in fully designing a 3D model of the desired surface structure. For this purpose, computer graphics tools such as 3D Studio Max may be used. However, doing 3D modeling is complex, requires highly skilled personnel, and is not necessarily worth the effort and cost for all types of items. In other embodiments, a 3D model may rather be used for the production of item manufacturing tools, such as stamps, using for instance, laser technology, instead of the item surface 3D model itself.

Possible embodiments for creating a 3D surface structure design use a 2D design/image as the basis pattern where the color/grayscale value represents the third dimension height information. In a possible embodiment, as described hereafter, embossing may be used to embed the 3D authentication features onto the item at manufacturing stage, but other technologies than embossing may be used for other production technologies, such as molding or printing for instance with technologies able to deposit large amounts of ink, such as silk screen printing, as known to those skilled in the art. The basis pattern may be designed using a digital process. This pattern may then be used to define the embossing pattern, for instance to produce an embossing tool or plate which may then be used in the item manufacturing process. In a possible embodiment, the pattern may be a binary bitmap, and a convention may be defined to identify if embossed areas are defined by white or black pixels. For instance, the white color pixels of the bitmap may represent areas which are embossed (therefore recessed) and black represent non-embossed areas. Other possible embodiments are course also possible, for instance 2D or 3D file formats describing a 2D or 3D shape, such as a .STL file for additive manufacturing, a .STEP file for machining, or a DXF vector file format, may be used to describe the 3D surface structure.

In order for the 3D structure to be effective and to provide a minimum level of security as an authentication feature, the design of the pattern must inherently feature a certain complexity level. For instance, a 3D structure with a limited number of flat surfaces may not reach the required complexity level, as it is easy to reverse engineer and to duplicate with simple equipment. On the other extreme, a white noise surface with frequencies going so high that they cannot be read anymore without highly specialized and costly technology such as laser micrometry. In a possible embodiment, decorative patterns, patterns resembling natural surfaces, such as snake skin texture, or random structures without any visual association, may be used. A combination of different design elements is also possible. For branding purposes, the 3D authentication structures may be combined with branding elements, such as logos, brand designs, brand colors, etc. The same is true for the global shape, where anything from a single line, to a rectangle, square, round ellipse, freeform, or even multiple distinct connected zones, may be used.

In a possible embodiment, random/pseudo random looking patterns may be used. The generation of random/pseudo random looking patterns may comprise the steps of:

Generating a specific number of dots at random or pseudo-random locations. In a possible embodiment, as illustrated by FIG. 1, these variable dot locations may be determined by a pseudo-random number generator, initialized with a pre-defined seed. In another possible embodiment, a real random generator based on physical properties, like a quantum effect generator for instance, may be used. In another possible embodiment, a combination of a deterministic process and a random/pseudo-random may be used to produce random looking and structured patterns. Other embodiments are also possible.

Generating a specific number of dots of variable sizes at various dot locations. In a possible embodiment, these variable dot sizes may be determined by a pseudo-random number generator initialized with a pre-defined seed. In another possible embodiment, a real random generator based on physical properties, like a quantum effect generator for instance, may be used. In another possible embodiment, a combination of a deterministic process and a random/pseudo-random may be used to produce random looking and structured patterns. Other embodiments are also possible.

Generating a specific number of dots of variable color/greyscale value (height) at various dot locations. In a possible embodiment, these variable dot values may be determined by a pseudo-random number generator initialized with a pre-defined seed. In another possible embodiment, a real random generator based on physical properties, like a quantum effect generator for instance, may be used. In another possible embodiment, a combination of a deterministic process and a random/pseudo-random may be used to produce random looking and structured patterns. Other embodiments are also possible.

Figure 2:
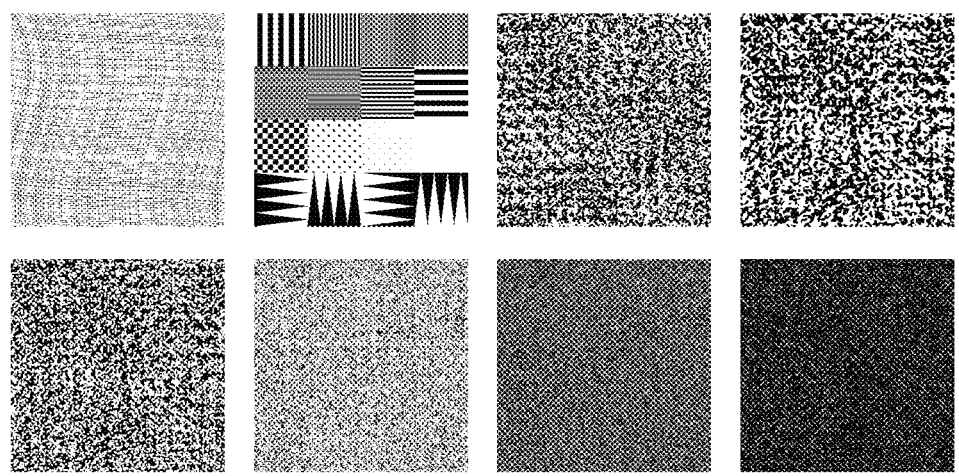
FIG. 2: Different types of patterns.

The above possible embedding steps may also be combined, for instance to produce a basis pattern image comprising both variable dot locations and variable dot greyscale values. Exemplary resulting 3D patterns are shown on FIG. 2. In a possible embodiment, the embedding steps may be selected specifically to match the requirements of the embossing production process used for manufacturing the item. In a further possible embodiment, the embedding steps may be adapted such that the resulting pattern exhibits specific mathematical properties, which can later be used to ease the automatic authentication process.

Figure 3:
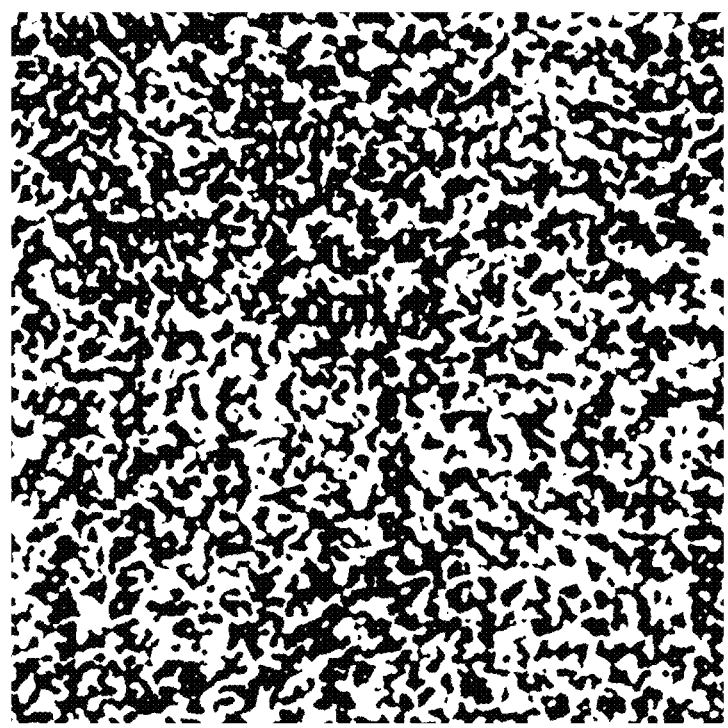
FIG. 3: Post-processed pattern after low-pass filtering and thresholding.

Depending on the requirement, a further post-processing step may be applied on the resulting basis pattern image. In a possible embodiment, the image may be adapted specifically to the embossing production process used for manufacturing the item. One example of post-processing consists in blurring the generated image. Other approaches include adding to the blurring (i.e. low-pass filtering) a subsequent threshold in order to define more rounded areas as shown in FIG. 3.

Figure 4:
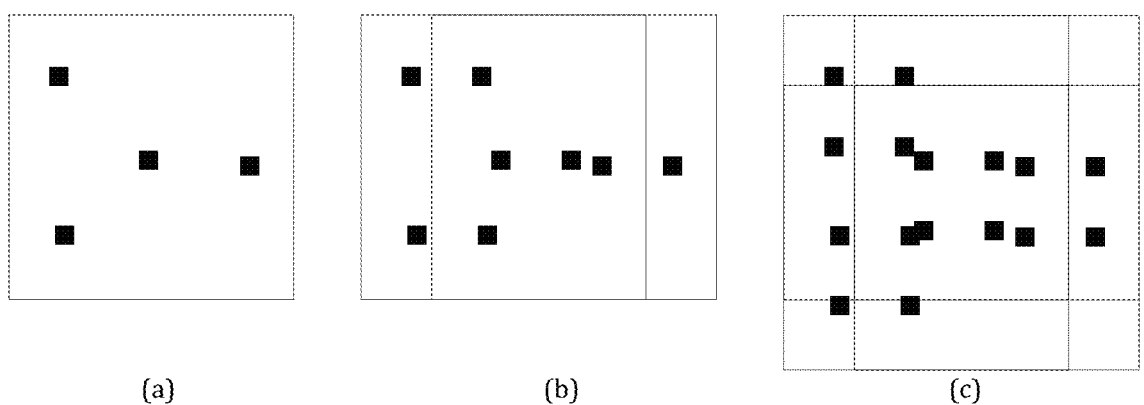
FIG. 4: Design of an auto-correlated pattern by 2 duplications (b) or 4 duplications (c) of a pseudo-random pattern (a).
Figure 5:
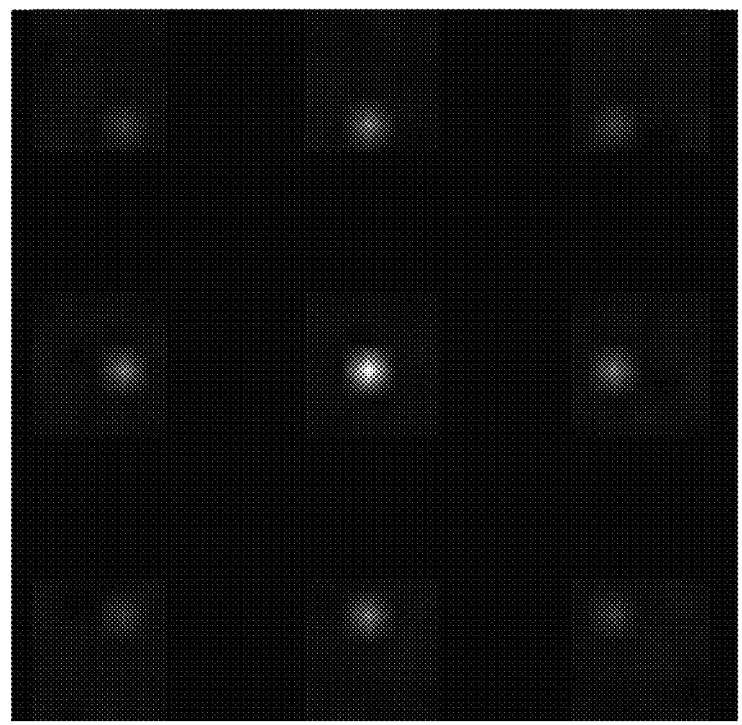
FIG. 5: Autocorrelation image showing the effect of a 4-times duplicated pattern.

In another possible embodiment, the post-processing operations such that may be selected such that the resulting pattern exhibits specific mathematical properties, which can later be used to ease the automatic authentication process. Examples of such mathematical properties are:

- A specific 2D frequency spectrum of the image, where some peaks are present at several known locations (Fx, Fy) of the amplitude of the Fourier Transform. This can be achieved for instance in the post-processing step by adding specific frequency peaks or even adjusting the frequency phases.
- Auto-correlation properties. In this case auto-correlated elements may be embedded by overlaying the original bitmap with duplicated and spatially shifted version of itself, as shown in FIG. 4 for instance, where (a) is the original pattern, (b) a 2-time shift-duplicated version and (c) a 4-time shifted-duplicated version. For a larger number of dots, the 2D auto-correlation image features peaks, as shown for instance in FIG. 5 (particular case of a 4 times shift-duplicate). In another possible embodiment, tiling of the original pattern may be used to introduce auto-correlation.

Embedding—Manufacturing

The 3D pattern or 3D model may then be used to create a tool for producing the desired 3D surface. In addition to the 3D structure of the surface, the reflectivity of the material may also have an impact on the effectiveness of the feature. In the following we describe a possible manufacturing embodiment which uses both the 3D structure and material reflectivity by means of hot stamping. Other embodiments are also possible.

The specific process used for illustration is based on a method called hot stamping. The manufacturing process consists in the following steps shown in FIG. 6:

Step a): Deposit of a reflective surface (2) on a substrate (1) (for instance by hot stamping, sticking (e.g., gluing) of the reflective surface or deposit of a metallic ink). This substrate can be either matte or reflective, like a metal foil for instance. This step can potentially be avoided if the embossing is directly performed on the substrate and the substrate is already reflective.

Step b): Embossing of the pattern (3) on the reflective surface (2). It can also performed directly on an aluminum blister as those used for pharmaceutical pills. In the particular case when the reflective surface is obtained using a metallic ink deposited on the substrate, then the embossing step can potentially be performed before the ink has dried, which enables performance of the embossing with a low mechanical pressure. The embossing step b) may be performed using embossing known to those skilled in the art, for instance by pressing a rigid plate on a hot-stamp foil (or whatever is used as embossing material, a paint would also work) in order to transfer the 3D shape of the rigid plate to the material to be embossed. During the operation, the material to be embossed may lay either on a flexible plate, such as a rubber plate, or a rigid plate having a negative 3D shape.

The rigid plate used for embossing, as well as the matching negative shape plate as relevant, may be created in such a way that their surface replicates in 3D the digital image basis pattern design, where the grayscale of each pixel specifies the height of the surface embossing. Such a plate may be obtained by chemical etching, or machining, or laser structuring. The main difference between the approaches is that machining and laser structuring enable one to specifically define the height of the plate in each location (therefore each grayscale value will have a specific height on the plate) while chemical etching is more a binary process (where the digital image pattern design has typically 2 colors representing etched or non-etched areas).

Yet another approach consists of combining step a) and step b) into one single operation. In this case, the hot-stamping process (or foil-stamping or any equivalent process) is performed with a tool surface which is not flat but rather features the pattern to be embossed.

Figure 6:
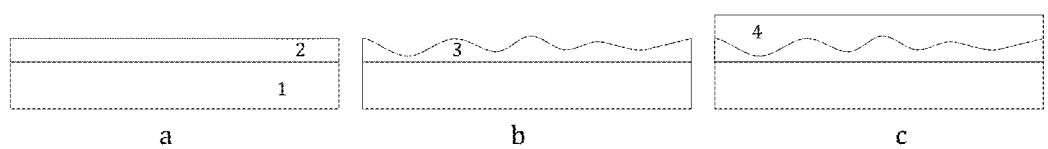
FIG. 6: Manufacturing approach based on the application of a reflective surface (a) followed by an embossing (b) and a varnishing (c).

In order to further protect the embossed pattern and prevent counterfeiting using molding, a further step c) may be applied, with reference to FIG. 6:

Step c): Optional deposit of an additional transparent layer or varnish (4). This deposit material may optionally be chosen in order to be difficult to remove. For instance, the additional layer or varnish material may be resistant to solvents. Conversely, the deposit material may optionally be chosen in order to be sensitive to the same solvents as the embossing material, so that the 3D authentication structure is also destroyed when in contact with solvents, thus preventing its surface characterization for counterfeiting. It is also possible to further secure the approach by creating a randomly variable shape of the varnish surface (hence disabling any surface scanning or molding approaches). The randomness can be inherent to the production process or made on purpose. Yet another approach for step c) consists in bonding/gluing a transparent auto-adhesive foil.

In a possible further embodiment, the additional varnish layer may also include some color tint in order to give a different visual appearance. As will be apparent to those skilled in the art, when the additional varnish layer is printed by flexography, offset or rotogravure, it is also possible to print a non-uniform layer of varnish, for instance by including small holes in the varnish layer in order to hide an invisible pattern. The methods of U.S. Pat. No. 7,684,088 or WO2006087351 may be applied to this end, but other approaches are also possible. Such a pattern can include for instance the Alpvision Cryptoglyph covert authentication feature which can be detected with a smartphone. Correlation between the detectability of the 3D pattern and of the varnish layer can also be used to ease detection, increase the security or add/improve other functionality.

Figure 7:
FIG. 7: Close-up of the resulting surface.
Figure 8:
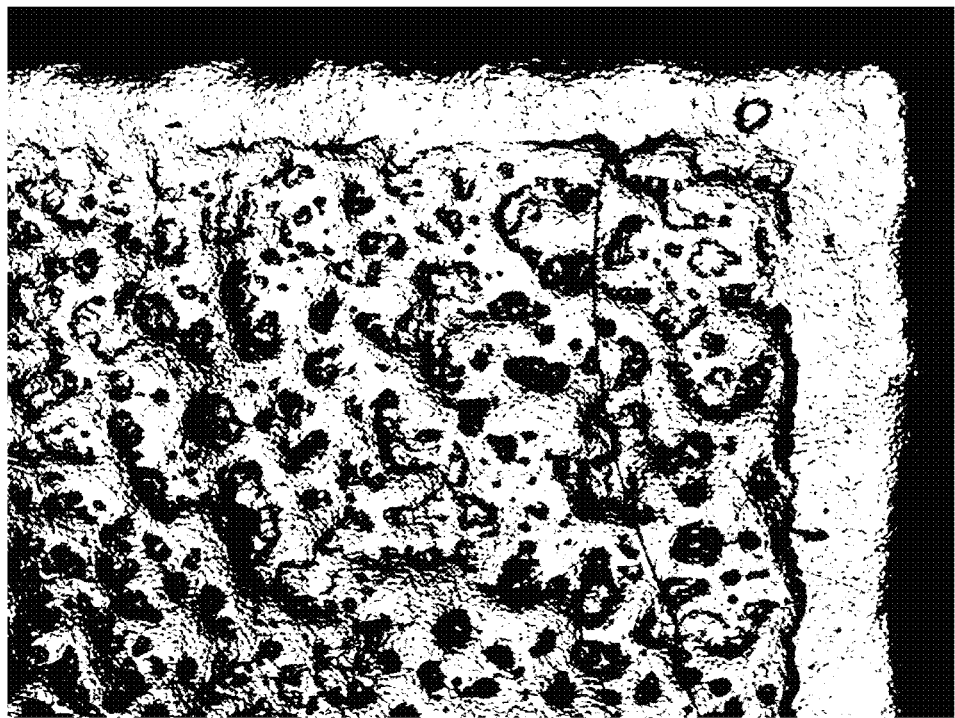
FIG. 8: Close-up of an embossed pattern based on different parameters.
Figure 9:
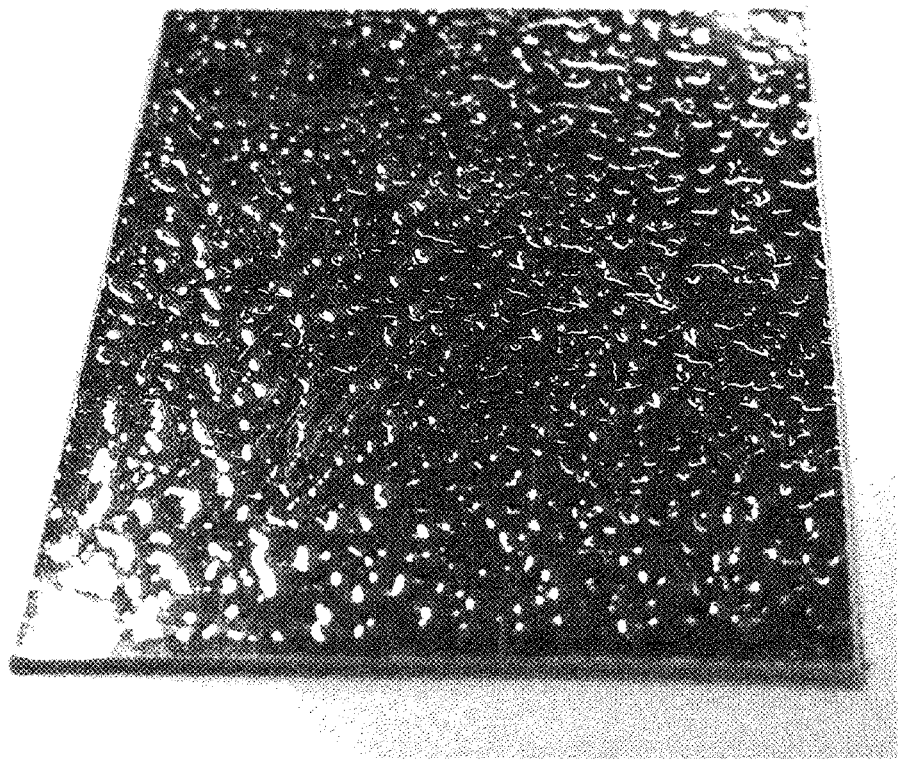
FIG. 9: Visual aspect of the embossed patter for a specific set of parameters.

The surface of an exemplary embossed item according to the latter method is shown in FIG. 9 and some close-ups are shown in FIG. 7 and FIG. 8.

As mentioned, the above example uses stamping to produce the desired 3D surface. However, other methods are possible, such as die casting, thermoforming, blow molding, and metal rolling to name a few.

All cited production methods share in common that they allow for the creation of a 3D surface structure. This structure must be such that its 3D nature can be characterized during the authentication process. This functioning is a key difference when compared to prior art methods, where only the 2D image of an embossed surface is compared to the expected 2D appearance.

Mode of Operation for Authentication

As mentioned earlier, authentication of a 3D surface from standard 2D imaging captures requires at least two image captures from two different viewpoints. In addition to the viewpoints, the illumination can also have an impact and even enhance the effectiveness if the illumination is different for the two viewpoints. For illustrative purposes we will describe the mode of operation for two viewpoints. However, in can be extended to any number. The extreme case would be a "continuous" viewpoint, for instance through moving a smartphone while running it in a video mode. In practice the video itself is not fully continuous but rather capturing 25 or 30 frames per second.

Figure 10:
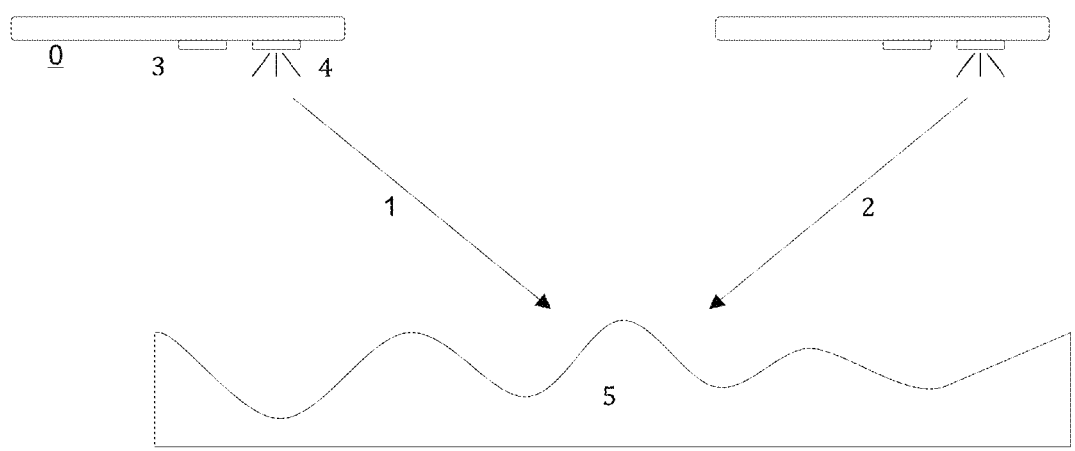
FIG. 10: Effect of the displacement of a smartphone on the acquired picture of a 3D pattern.
Figure 11:
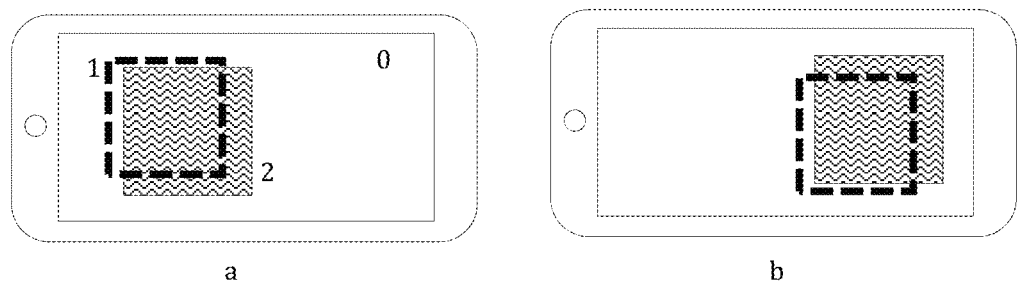
FIG. 11: Use of digital overlay to guide the operator from a position (a) to a position (b).

In the simplest case with two viewpoints, the detection is based on the use of two different images taken with different illuminations and positions. FIG. 10 shows the smartphone (0) at 2 different positions and the smartphone camera (3) used to take the pictures that are analyzed in the authentication step to detect the presence or absence of the 3D authentication pattern feature. It can be seen that depending on the incident light direction (1) or (2) of the flash (4), a different side of the embossed pattern (5) is seen by the camera and lit up by the flash, as shown on FIG. 14 and FIG. 15. In order to guide the operator to take these 2 pictures, as shown on FIG. 11, a digital overlay (1) may be displayed on the smartphone screen (0), and the operator may be instructed to align the overlay with the embossed pattern view (2) respectively at 2 positions (a) and (b) of the smartphone and the corresponding overlays prior to the embossed pattern image capture. Other embodiments are also possible, where the user may take any two images from any position, with or without overlay.

In a possible embodiment, the pattern detection and image analysis authentication steps may be performed in real-time directly on each image of the video stream coming from the camera using a dedicated application running on the smartphone, with the flash light continuously on and with the application digitally cropping the area corresponding to the overlay (or at a known position from the overlay). As soon as the pattern is positively detected on position (a), the smartphone application may automatically replace the overlay of position (a) by the overlay of position (b), which guides the operator to move the smartphone to position (b), then the real-time image analysis of the video stream goes on until the success of the second detection. It is also possible to implement methods to trigger a "not detected" stop of the video capture, for instance through a timeout when there is no successful detection within a given time period.

While the flash, or any other light source, may facilitate the authentication process, it is also possible to run the pattern detection and image analysis authentication steps by only changing the viewpoint and not the light source.

Software Distribution

To facilitate the above described handheld authentication, it is desirable to execute a specific software application on the imaging device, and therefore a distribution method of this application has also to be put in place in the case where the application is not part of the pre-installed software of the device.

In a possible embodiment, the aforementioned application can be downloaded from the Internet directly into the imaging device. The download link (or URL) can be communicated to the operator in various ways such as email, phone call, SMS, printed in clear text (for instance on a label or the product packaging itself) or encoded into a machine readable code (for instance 1D barcode, 2D code, datamatrix, QR code, etc.). One motivation to embed the URL in a machine readable code on the product is that many code reading applications are already deployed on devices such as smartphones and enable to access to download links. Similarly, many applications are also capable of decoding human readable text URL (for instance using optical character recognition technologies) and accessing them in order to download an application.

Figure 17:
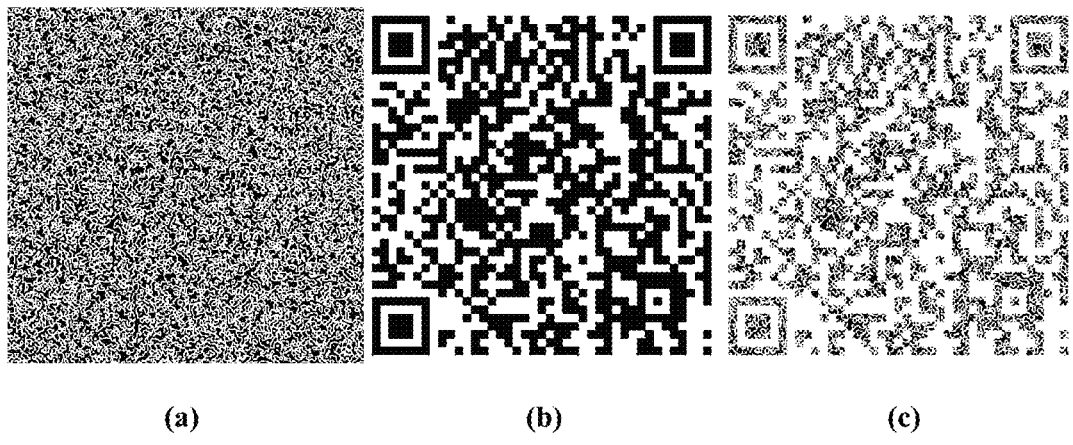
FIGS. 17 (a), (b), and (c): from left to right, original bitmap pattern, QR code and composed bitmap, respectively.
Figure 18:
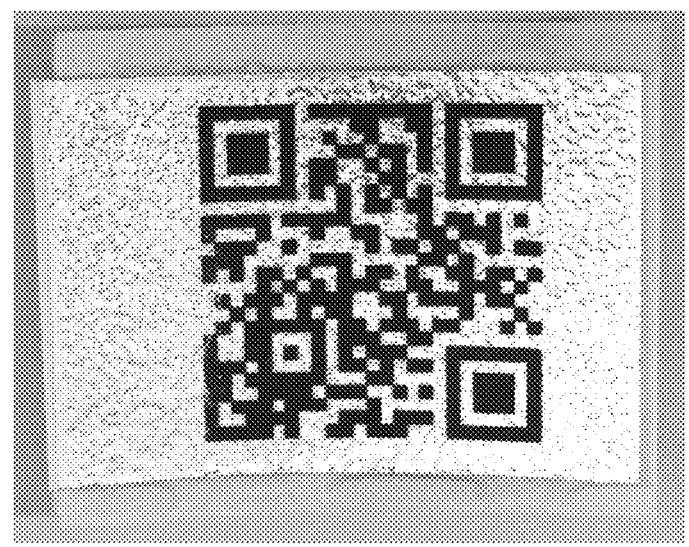
FIG. 18: Example of a QR-code overprinted over an embossed pattern.

In another embodiment, the 3D pattern itself may be used to encode the information necessary to download the application. For instance, the embossed pattern may be further modified such that it includes a text or machine-readable download code as shown in FIG. 17. More precisely this modification can be applied to the hot stamped or to the embossing pattern, therefore modifying locally the reflectivity or the 3D surface in order to convey the download information. Many ways exist to create a modified pattern by combining the code and the original pattern. The download code may also be partially overprinted over the embossed pattern, as represented on FIG. 18. The only basic requirements is that it is still possible to authenticate and to retrieve the URL from the modified pattern.

Figure 19:
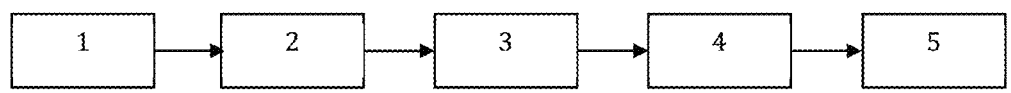
FIG. 19: Process for download and authentication.

The entire process for authentication then becomes as shown in FIG. 19:

1. Take a picture of the download code using the imaging device (smartphone for instance)
2. Decode the URL from the download code using a computer (for instance on the imaging device itself, using the processor of the smartphone, but the picture can also be sent elsewhere for decoding purposes)
3. Connect to the decoded URL and download on the imaging device a software application to detect the embossing code (the download may be a multistep process, like opening the webpage of the URL and then selecting a download link for the application).

4. Run the downloaded application and capture pictures according to the mode of operation for authentication described above.
5. Display the authentication result.

In order to cover any possible combination strategies, we provide below a mathematical description of a sufficient condition that has to be met by the modified pattern: let P and P' be 2 different patterns, let U be the URL of the application, let θ( ) be a function generating a machine readable pattern from a URL, let π( ) be the physical realization enabling the combination of P and θ( ), let ω( ) be a digital captured image of this physical realization, let Ψ( ) be the image authentication process described hereafter which gives 1 when authentication is successful and ( ) otherwise, then this combination method can be used if both following equations are met:

$$\Psi(\omega(\pi(P, \theta(U))), P') = \begin{cases} 1 \text{ if } P = P' \\ 0 \text{ otherwise} \end{cases}$$

$$\theta^{-1}(\omega(\pi(P, \theta(U))), P') = U$$

One example of the combination operation is a Boolean composition of the pattern and of the QR code in such a way that all black pixels of the QR code result in a flat surface (and possibly also not hot stamped) while the white pixels of the QR code result in an embossed and hot stamped surface (3D smart embossing). Other examples of Boolean operations may include to negate the grayscale value of the pattern in areas where QR code has black pixels (and possibly changing back the digital pattern used during the comparison step of the authentication process in order to invert those modifications). Another example is to follow one of the manufacturing processes described above applied on P and followed by an overprinting of θ( ).

Image Analysis

The image analysis authentication step will now be described in more detail. The image analysis authentication step enables the automatic determination if a product under inspection is an authentic product, by analyzing whether the acquired images represent with sufficient accuracy the 3D authentication pattern, while in a counterfeit product, the 3D authentication pattern copy is typically of much lower quality than the original. In a preferred embodiment, the image analysis authentication step checks, in a fast and reliable way, if a series of pictures, for instance from a couple of image captures or from a video stream, verifies the two following specific conditions:
1. A sufficient number of images in the series of pictures characterize the digital image that was used to create the three dimensional structure, such as the embossing plate, in sufficient precision.
2. The surface under inspection has three-dimensional characteristics.

As known to those skilled in the art, 3D surfaces may be reconstructed using multiple 2D images. For instance, "shape from shading" methods enable to reconstruct the 3D shape of a surface from one or several images taken with different lighting conditions. However, those solutions are generally complex, slow and very sensitive to lightning conditions, and therefore not appropriate for real-time detection using a smartphone with unknown orientations relative to the observed sample and in uncontrolled lightning conditions.

One approach to assess the two authentication conditions simultaneously using at least two dimensional images from a series of picture captures, for instance obtained with a smart phone camera, is by computing the cross-correlation image C between the 3D pattern image D (as shown on FIG. 1 for instance) and the acquired authentication pattern image I, the cross-correlation producing a characteristic signal between I and D. In a preferred embodiment, the acquired authentication pattern image I is first pre-processed into a flattened version f(I) by digital image filtering methods known in the art, for instance by local equalization or high-pass filtering, so as to get rid of macroscopic lighting variations. If we write * the cross-correlation operation, we then have:

$$C = D * f(I)$$

The conditions 1 and 2 above can now be verified as follows:
1. For genuine items, the cross-correlation image, or characteristic signal, C exhibits a peak with a signal to noise ratio s above a predefined threshold Ts, for instance by evaluating the following expression:

$$s = 20\text{Log}_{10}\left(\frac{C_{max} - C_{min}}{C_{mean} - C_{min}}\right) > Ts$$

Figure 16:
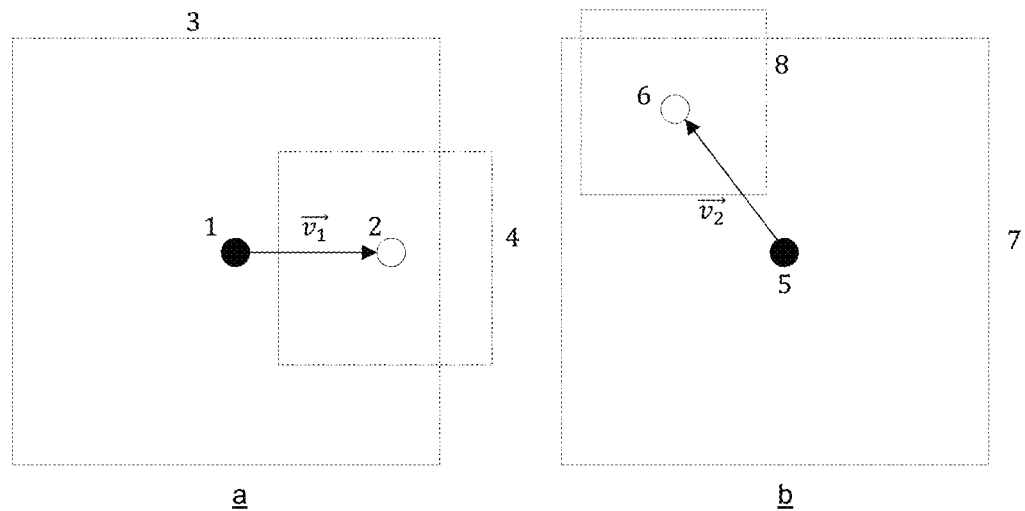
FIG. 16: Computation of the vector characterizing the direction of the incident light for 2 positions (a) and (b).

2. For 3D surfaces, the effect of lighting variation on captured images of the surface for at least two different positions, viewpoints, of the imaging device, generates a difference between the first and second characteristic signal. In the case of the position of the peak, as explained in the previous first step, this difference may be verified as follows:
   a. For position (a) of FIG. 11, corresponding to the acquired image $I_1$, compute the cross-correlation image, characteristic signal:

$$C_1 = D * f(I_1)$$

b. On the cross-correlation image $C_1$, compute the 2D vector $\vec{v_1}$ joining the point of highest correlation value (FIG. 16.a.1) in a pre-defined area (FIG. 16.a.3) to the point of the lowest correlation value (FIG. 16.a.2) in a pre-defined neighborhood of the latter (FIG. 16.a.4)
   c. Do the same for position (b) (with the different corresponding points and neighborhood shown in (FIG. 16.b.5 to FIG. 16.b.8) in order to compute the vector $\vec{v_2}$ on $C_2$ according to:

$$C_2 = D * f(I_2)$$

d. Compute the absolute value of the angle α between $\vec{v_1}$ and $\vec{v_2}$, then verify that it exceeds a predefined threshold $\alpha_s$:

$$\alpha = |\text{angle}(\vec{v_1}, \vec{v_1})| > \alpha_s$$

Figure 12:
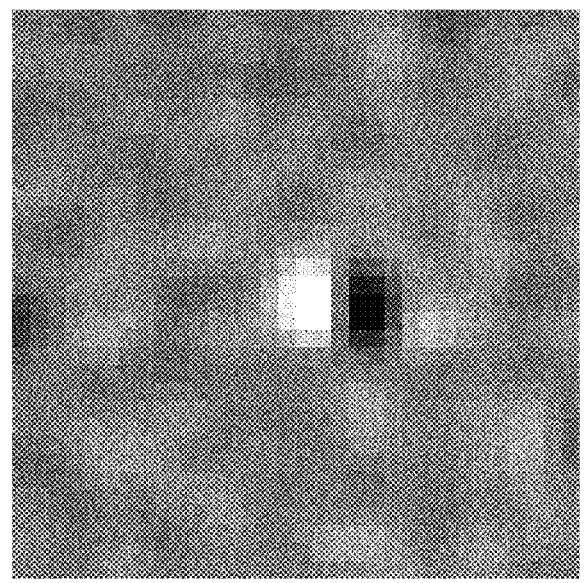
FIG. 12: Close-up on the cross-correlation pattern for one smartphone position.
Figure 13:
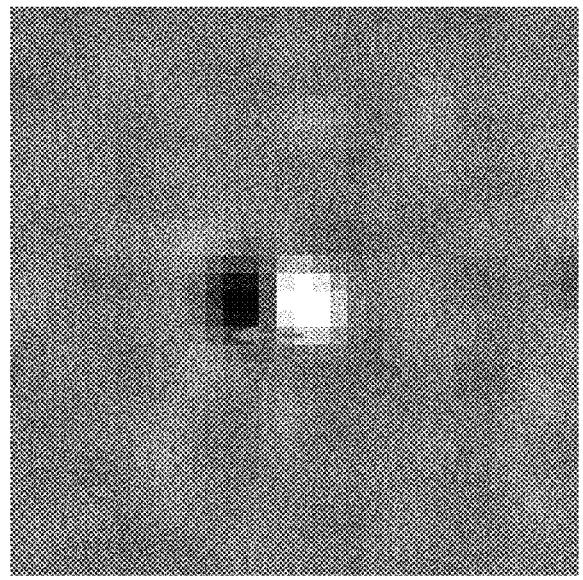
FIG. 13: Close-up on the cross-correlation pattern for a different smartphone position.
Figure 14:
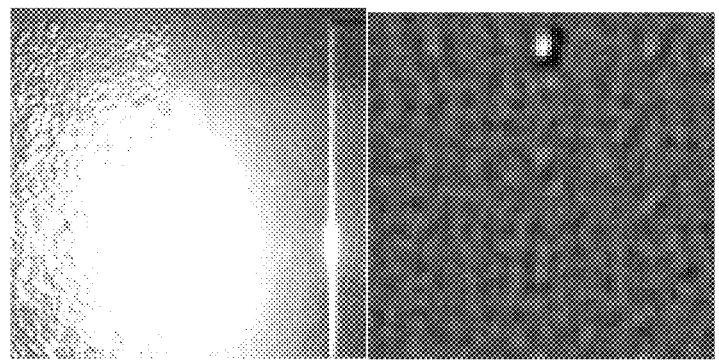
FIG. 14: Image viewed by the smartphone and corresponding cross-correlation image for a first position.
Figure 15:
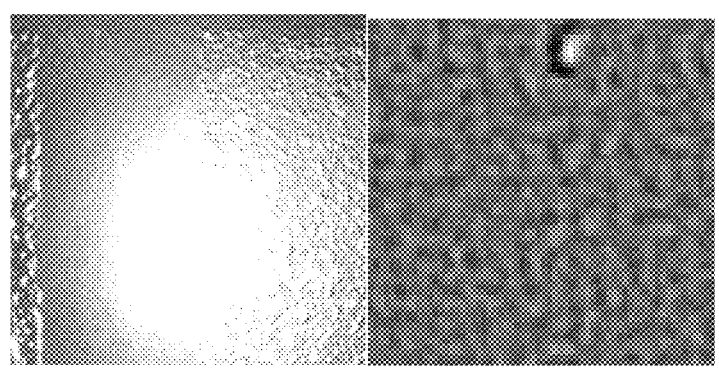
FIG. 15: Image viewed by the smartphone and corresponding cross-correlation image for a second position.

Examples of cross-correlation images corresponding to the steps 2a and 2b above are shown on FIG. 12 and FIG. 13 respectively as well as on FIG. 14 and FIG. 15.

The cross-correlation introduced above is of course only one possible embodiment to measure the similarity between 3D pattern image, which may be pre- and/or post-processed, and the acquired authentication pattern image, which may also be pre- and/or post-processed. The described cross-correlation has been used for its simplicity and elegance, but many other approaches can be used to measure the similarity. Such approaches may for instance be based on any kind of difference computations, such as absolute difference, squared difference, etc. More sophisticated methods can use similarity measurements in different projection domains, such as multi-resolution transforms, or even neural networks.

Depending on the viewpoints, lightening conditions, and initial design of the 3D surface, many different 2D image patterns can be observed. The above embodiment has been detailed as an example, but other embodiments may also be possible as will be apparent to those skilled in the art, for instance:

The 3D authentication structure may be designed in a way that certain surface elements are only visible for specific viewpoints and hidden when the viewpoint changes.

The 3D authentication structure may be designed in a way that it throws very specific shadows, resulting in different correlation patterns for different viewpoints and/or lightening.

The 3D authentication structure may be designed in a way that from specific viewpoints, the different 3D elements interfere with each other and generate very specific interference patterns.

Some 3D structures can be designed in order to exhibit a regular grid appearance, for instance for aesthetic reasons. This is the case of the Boegli approach for instance, where a template of regular "defects" is voluntarily are camouflaged in the grid structure. In this case, detection can still be done using the above described approaches and can also further be adapted by:

Pre-filtering the acquired image in order to attenuate the enhance the defects visibility And/or post-filtering the cross-correlation (or any other domain transformed data) in order to decrease the signal related to the grid and increase the signal related to the defects template.

Experimental Results Robustness to Counterfeiting

Three types of counterfeiting approaches are contemplated in the following: 2D scan-print, 3D molding and 3D scan-replicate.

2D Scan-Print:

One of the primary objective of this 3D surface design is the fact that a duplication using a 2D scan and print will result in a pattern which does not exhibit the properties listed in the Image Analysis section above. Indeed, the core reason why FIG. 12 and FIG. 13 are different is caused by the fact that a 3D structure illuminated and observed from 2 different positions leads to 2 different images. On the contrary, a purely 2D pattern will provide 2 very similar images, with the differences being mainly a different global illumination and geometric distortions induced by the changing viewpoint and camera.

3D Molding:

Another counterfeiting approach consists in molding (or any other type of transfer of the 3D structure) the surface structure in order to directly create a copy or to create a tool that can be used for rapid duplication (by embossing or molding for instance). One solution to render this copy process more difficult is illustrated on FIG. 6 and consists in filling up the surface with a transparent material. This material can optionally be chosen in order to be difficult to remove. For instance, it is appropriate for such material to be resistant to solvents. Another approach is to use a material that is easily destroyed when in contact with solvents.

3D Scan-Replicate:

A 3D scanner may also be used to acquire the 3D surface of the pattern. Then, this information is used to create a tool, for instance an embossing punch, by chemical etching or machining. Here again, the 3D acquisition by a laser scanner can be rendered much harder if the 3D pattern is overlaid with a uniform varnish layer.

The invention claimed is:

1. A method for authenticating a 3D pattern of a surface with an imaging device, comprising the steps of:
   providing, with an imaging device screen, an indication of a first imaging device position;
   capturing, with an imaging device camera, a first digital image of the 3D pattern surface;
   comparing, with an imaging device processor, the first digital image with a 3D pattern reference image to generate a first characteristic signal;
   providing, with an imaging device screen, an indication of a second imaging device position;
   capturing, with the imaging device camera, a second digital image of the 3D pattern surface;
   comparing, with the imaging device processor, the second digital image with the 3D pattern reference image to generate a second characteristic signal;
   measuring, with the imaging device processor, a difference between the first and second characteristic signals;
   determining, with the imaging device processor, an authenticity of the 3D pattern based at least in part on whether the measured difference is above a pre-defined threshold;
   wherein comparing the first digital image with the 3D pattern reference image includes cross-correlating the first digital image with the 3D pattern reference image to generate a first cross-correlation signal, and wherein comparing the second digital image with the 3D pattern reference image includes cross-correlating the second digital image with the 3D pattern reference image to generate a second cross-correlation signal; and
   wherein measuring a difference between first and second characteristic signals further comprises filtering the first or second cross-correlation signal.

2. The method of claim 1, wherein comparing the first digital image with a 3D pattern reference image further comprises pre-processing the first digital image, and wherein comparing the second digital image with a 3D pattern reference image further comprises pre-processing the second digital image.

3. The method of claim 1, wherein comparing the first digital image with the 3D pattern reference image includes calculating the absolute difference between the first digital image and the 3D pattern reference image, and wherein comparing the second digital image with the 3D pattern reference image includes calculating the absolute difference between the second digital image and the 3D pattern reference image.

4. The method of claim 1, wherein comparing the first digital image with the 3D pattern reference image includes calculating the squared difference between the first digital image and the 3D pattern reference image, and wherein comparing the second digital image with the 3D pattern reference image includes calculating the squared difference between the second digital image and the 3D pattern reference image.

5. The method of claim 1, wherein comparing the first digital image with the 3D pattern reference image includes calculating a multi-dimensional transform of the first digital image and the 3D pattern reference image, and wherein comparing the second digital image with the 3D pattern reference image includes calculating a multi-dimensional transform of the second digital image and the 3D pattern reference image.

6. The method of claim 1, wherein comparing the first digital image with the 3D pattern reference image is performed using a neural network, and wherein comparing the second digital image with the 3D pattern reference image is performed using the neural network.

7. The method of claim 1, further comprising:
indicating to an end user, by displaying a message onto the imaging device display screen, that the 3D item is authenticated.

8. The method of claim 1, further comprising:
indicating to an end user, by emitting a sound onto an imaging device display speaker, that the 3D item is authenticated.

9. The method of claim 1, further comprising:
indicating to an end user, by producing a vibration of the imaging device, that the 3D item is authenticated.

10. The method of claim 1, wherein the 3D pattern reference image represents random or pseudo random dot locations.

11. The method of claim 1, wherein the 3D pattern reference image represents random or pseudo random dot sizes.

12. The method of claim 1, wherein the 3D pattern reference image represents random or pseudo random dot greyscale values.

13. The method of claim 1, wherein the imaging device is a smartphone.

14. The method of claim 1, wherein the 3D pattern surface is filled with a substantially transparent material resistant to solvents.

15. The method of claim 1, wherein the 3D pattern surface is covered with a transparent sticker material resistant to solvents.

16. The method of claim 1, wherein the 3D pattern surface material is sensitive to certain solvents, and the 3D pattern is filled with a transparent material sensitive to the same solvents as the embossed item surface material.

17. The method of claim 1, wherein the 3D pattern surface material is sensitive to certain solvents, and the 3D pattern is covered with a transparent sticker material sensitive to the same solvents as the embossed item surface material.

18. The method of claim 1, wherein an additional transparent layer or varnish is deposited over the 3D pattern surface.

19. The method of claim 15, wherein the surface of the additional layer or varnish has a randomly variable shape.

20. The method of claim 15, wherein the additional layer or varnish has a color tint.

21. The method of claim 15, wherein the additional layer or varnish is a non-uniform deposit.

22. The method of claim 1, wherein the 3D pattern is combined with a download code and wherein providing, with the imaging device screen, an indication of a first imaging device position further comprises capturing, with the imaging device, the download code, decoding an URL from the download code, connecting to the URL, downloading an software application from the URL to the imaging device, and running on the imaging device the software application to provide to an end user, with the imaging device screen, an indication of a first imaging device position.

23. The method of claim 1, wherein the imaging device comprises a light source and wherein the first imaging position corresponds to a first angle between the light source and the 3D pattern surface and the second imaging device position corresponds to a second angle between the light source and the 3D pattern surface.

* * * * *